(12) United States Patent
Marwah et al.

(10) Patent No.: US 11,431,792 B2
(45) Date of Patent: Aug. 30, 2022

(54) DETERMINING CONTEXTUAL INFORMATION FOR ALERTS

(71) Applicant: HEWLETT PACKARD ENTERPRISE DEVELOPMENT LP, Houston, TX (US)

(72) Inventors: Manish Marwah, Palo Alto, CA (US); Renato Keshet, Haifa (IL); Barak Raz, Tel Aviv (IL); Brent James Miller, Raleigh, NC (US)

(73) Assignee: Micro Focus LLC, Santa Clara, CA (US)

( * ) Notice: Subject to any disclaimer, the term of this patent is extended or adjusted under 35 U.S.C. 154(b) by 402 days.

(21) Appl. No.: 15/420,420

(22) Filed: Jan. 31, 2017

(65) Prior Publication Data

US 2018/0219876 A1  Aug. 2, 2018

(51) Int. Cl.
*H04L 29/06* (2006.01)
*H04L 67/104* (2022.01)
*H04L 9/40* (2022.01)
*H04L 12/46* (2006.01)

(52) U.S. Cl.
CPC ........ *H04L 67/104* (2013.01); *H04L 63/1408* (2013.01); *H04L 12/4641* (2013.01)

(58) Field of Classification Search
None
See application file for complete search history.

(56) References Cited

U.S. PATENT DOCUMENTS

| | | |
|---|---|---|
| 7,624,448 B2 | 11/2009 | Coffman |
| 8,739,290 B1 | 5/2014 | Jamail et al. |
| 9,064,210 B1 | 6/2015 | Hart |
| 9,306,962 B1 | 4/2016 | Pinto |
| 2002/0099579 A1* | 7/2002 | Stowell ............... G06Q 10/063 705/7.11 |
| 2002/0099598 A1* | 7/2002 | Eicher, Jr. ............. G06Q 10/06 705/28 |
| 2004/0177053 A1* | 9/2004 | Donoho ................ G06Q 10/04 707/999.107 |
| 2007/0209074 A1 | 9/2007 | Coffman |
| 2008/0307525 A1 | 12/2008 | Nickle |
| 2012/0072983 A1* | 3/2012 | McCusker ........... H04L 63/126 726/22 |
| 2012/0254333 A1* | 10/2012 | Chandramouli ........ G06F 40/10 709/206 |
| 2013/0024937 A1* | 1/2013 | Glew .................... G06F 21/577 726/23 |

(Continued)

OTHER PUBLICATIONS

Chakraborty, Jayanta; Chakraborty, Mohuya. Mobile Telephony Based Secured Society an Anti-Terrorism Attempt. TENCON 2008—2008 IEEE Region 10 Conference. https://ieeexplore.IEEE.org/stamp/stamp.jsp?tp=&arnumber=4766383 (Year: 2008).*

Skubic, Marjorie et al. Automated Health Alerts Using In-Home Sensor Data for Embedded Health Assessment. IEEE Journal of Translational Engineering in Health and Medicine, vol. 3. https://ieeexplore.ieee.org/stamp/stamp.jsp?tp=&arnumber=7084165 (Year: 2015).*

(Continued)

*Primary Examiner* — Jeremiah L Avery (57) ABSTRACT

In some examples, an alert relating to an issue in a computing arrangement is received. Contextual information is determined for the alert, the determined contextual information comprising spatial and temporal distributions of previous instances of the alert or similar alerts. The contextual information is communicated for use in addressing the issue in the computing arrangement.

20 Claims, 3 Drawing Sheets

(56) References Cited

U.S. PATENT DOCUMENTS

| | | | | |
|---|---|---|---|---|
| 2013/0024939 A1* | 1/2013 | Glew | ................ | H04L 63/1408 |
| | | | | 726/22 |
| 2013/0081134 A1* | 3/2013 | Glew | .................... | G06F 21/552 |
| | | | | 726/22 |
| 2013/0217332 A1* | 8/2013 | Altman | ................. | H04H 60/90 |
| | | | | 455/3.01 |
| 2015/0081885 A1 | 3/2015 | Thomas et al. | | |
| 2015/0106867 A1 | 4/2015 | Liang | | |
| 2015/0163242 A1 | 6/2015 | Laidlaw et al. | | |
| 2015/0264077 A1 | 9/2015 | Berger et al. | | |
| 2015/0364022 A1* | 12/2015 | Dyell | .................... | A61B 5/746 |
| | | | | 340/573.1 |
| 2016/0050225 A1 | 2/2016 | Carpenter et al. | | |
| 2016/0080502 A1* | 3/2016 | Yadav | .................... | H04L 47/22 |
| | | | | 709/227 |
| 2016/0164893 A1 | 6/2016 | Levi | | |
| 2016/0352759 A1 | 12/2016 | Zhai | | |
| 2017/0032463 A1* | 2/2017 | Hunter | ................ | G06F 16/2457 |
| 2017/0063709 A1 | 3/2017 | Smith | | |
| 2017/0116581 A1* | 4/2017 | Shah | ................ | G06Q 10/1097 |
| 2017/0126523 A1 | 5/2017 | Chen | | |
| 2017/0220651 A1* | 8/2017 | Mathew | ................ | G06F 16/248 |
| 2017/0224214 A1* | 8/2017 | Saigh | ................ | A61B 5/6801 |
| 2017/0251013 A1 | 8/2017 | Kirti | | |
| 2018/0091528 A1 | 3/2018 | Shahbaz | | |

OTHER PUBLICATIONS

Manage Engine, "EventLog Analyzer is an IT Compliance & Log Management Software for SIEM", Dec. 19, 2016, Zoho Corp., 4 pages.

Prelude, "Prelude—a Cs Product", 2016, Available at: <prelude-siem.org/projects/prelude>, 1 page.

Efflux Analytics, "Security Automation is Here," Nov. 2, 2015, 8 pages.

Bania et al., U.S. Appl. No. 15/420,417 entitled Grouping Alerts Into Bundles of Alerts, filed Jan. 31, 2017, 26 pages.

Hexadite, "Cyber analyst thinking at the speed of automation", Jan. 6, 2017, 15 pages.

HPE, "Hewlett Packard Enterprise Unveils Foundation for Next-Generation Intelligent Security Operations", Sep. 14, 2016, 6 pages.

Karim Al-Saedi et al. "Research Proposal:An Intrusion Detection System Alert Reduction and Assessment Framework Based on Data Mining", Journal of Computer Science, 2013, 6 pgs.

Manadhata et al., U.S. Appl. No. 15/420,521 entitled Responding to Alerts, filed Jan. 31, 2017, 26 pages.

Tirath Singh, "An Effective Approach for Building Your Security Operations Center and Taking It to the Next Level", 2015, White Paper, Tata Consultancy Services Ltd.,13 pages.

* cited by examiner

DETERMINING CONTEXTUAL INFORMATION FOR ALERTS

BACKGROUND

A computing arrangement, which can include a network of computers and other types of devices, can be subject to unauthorized access or attack. Unauthorized access can be performed by users or programs. Attacks can include attacks by malware, denial-of-service attacks, and so forth. Other anomalies or issues can also exist in a computing arrangement.

BRIEF DESCRIPTION OF THE DRAWINGS

Some implementations of the present disclosure are described with respect to the following figures.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Security issues in a computing arrangement can relate to any or some combination of the following activities: unauthorized access of data, a program, or machine in the computing arrangement; an attack on the computing arrangement that is intended to cause damage or errors in components of the computing arrangement; an action that violates a specified policy, government regulation, or standards specification; fault or error during operation of a program or machine; or any other activity that can compromise the security or operational integrity of the computing arrangement. The foregoing activities can occur as a result of a user performing an unauthorized login or access of the computing arrangement, either from within a boundary of the computing arrangement or from outside the boundary of the computing arrangement, execution of malware (e.g., viruses, adware, spyware, etc.) in the computing arrangement, denial-of-service (DoS) attacks, malfunctioning programs or machines, or other activities.

A "computing arrangement" can refer to any arrangement that includes any or some combination of the following, whether at one geographic location or at multiple geographic locations: a computer (or alternatively, multiple computers), a communication node (or alternatively, multiple communication nodes), a storage device (or alternatively, multiple storage devices), a printer (or multiple printers), a server (or multiple servers), and other electronic devices. A "boundary" of the computing arrangement can be provided by systems at the edge of a network that allow electronic devices in the computing arrangement to communicate with external devices. For example, such edge systems can include any or some combination of the following: firewalls, gateways, network address translators, routers, switches, and so forth.

An enterprise can establish a security operation center (SOC) to protect the computing arrangement from security issues. An enterprise can refer to a business concern, a government agency, an educational organization, or any other entity that has a computing arrangement.

An SOC can refer to any entity (such as a department, a division, or any other organizational unit) that is responsible for protecting the computing arrangement in response to security issues. In an SOC, analysts may monitor for alerts relating to security issues in the computing arrangement, and in response to the alerts, can take actions to address the security issues.

In some examples, security alerts can be generated by a security information and event management (SIEM) system, which can refer generally to an infrastructure, made up of hardware equipment and machine-readable instructions (software and/or firmware), that is able to collect data relating to events in the computing arrangement, and to generate security alerts in response to the collected event data.

Although reference is made to security alerts in some examples, it is noted that in other examples, solutions according to some implementations can be applied to other types of alerts relating to other issues that may be present in a computing arrangement, where such issues can affect the performance of the computing arrangement or can cause the computing arrangement to exhibit errors or violate policies, rules, and so forth.

Traditionally, analysts of an SOC can perform manual investigations to respond to alerts. For example, in response to an alert, the manual investigation performed by a human analyst can include collecting more information to make sense of the alert, and to determine whether or not the alert relates to a true positive (i.e., the alert correctly indicated that a security issue has occurred) or a false positive (i.e., the alert incorrectly indicated that a security issue has occurred). The investigation can further involve hypothesis generation (to generate a hypothesis regarding why the alert occurred) and testing the hypothesis to determine if the hypothesis is correct. If the wrong hypothesis is proffered, then the analyst may have to back up and try a new hypothesis, which can be time consuming and labor intensive.

The amount of information relating to an alert that is provided to an analyst can be sparse. As a result, the analyst can spend a large amount of time and effort in trying to obtain further information relating to the alert to allow the analyst to better understand the alert. In accordance with some implementations of the present disclosure, in response to receiving an alert (either a single alert or a collection of alerts), a context building system is able to automatically determine a richer set of contextual information to provide to an analysis entity, such as a human analyst or an alert management system. The contextual information can include, as examples, distributions of instances of the alert or similar alerts, where the distributions can include a spatial distribution of instances of the alert or similar alerts across different physical or virtual locations, or a temporal distribution of instances of the alert or similar alerts across time instances. Other contextual information can include statistics, correlation information that correlates alerts, information of prior investigations to resolve an issue associated with the alert, and so forth.

Figure 1:
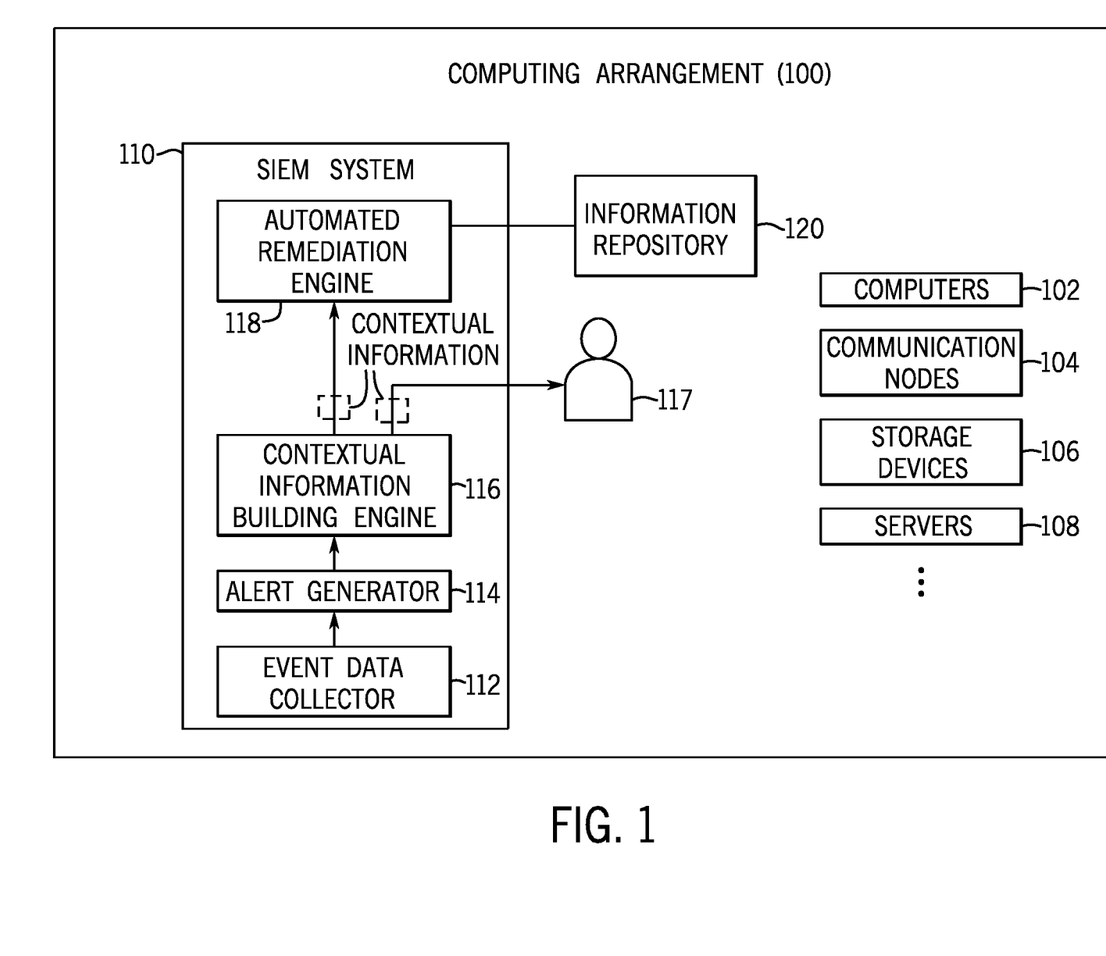
FIG. 1 is a block diagram of a computing arrangement according to some examples.

FIG. 1 is a block diagram of an example computing arrangement 100, which includes computers 102, communication nodes 104, storage devices 106, servers 108, and other types of electronic devices. The computing arrangement 100 can be a data center, an information technology (IT) infrastructure, or any other type of arrangement that includes electronic devices.

The computing arrangement 100 also includes a security information and event management (SIEM) system 110, which includes an event data collector 112 to collect data relating to events associated with the various electronic devices of the computing arrangement 100. For example, events can include login events, events relating to loading of programs, events relating to execution of programs, events relating to accesses made of components of the computing arrangement 100, errors reported by machines or programs, events relating to performance monitoring of various characteristics of the computing arrangement 100, including monitoring of network communication speeds, execution speeds of programs, network events relating to external communications to and from the computing arrangement (e.g., number of bytes transferred, number of packets transferred, connections established, protocols used, external Internet Protocol (IP) addresses used, domains contacted, etc.), and so forth.

Event data collected by the event data collector 112 can include attributes associated with each event, where attributes can include any or some combination of the following: an entity (machine or program) associated with the event (e.g., the entity that triggered the event, the entity on which an activity was occurring when the event occurred, etc.), a type of operating system associated with the event, a type of application program associated with the event, a network address associated with the event, and so forth.

The event data collector 112 provides the collected event data to an alert generator 114. The alert generator 114 can apply specified rules or policies to determine whether or not, based on an event or a collection of events represented by the collected event data, a corresponding security alert is to be generated. A security alert produced by the alert generator 114 can be provided to a contextual information building engine 116, which is able to respond to the security alert, or any other type of alert, to create contextual information for the alert. Creating contextual information for an alert can refer to creating contextual information for one alert or for a bundle of alerts (which are similar to one another).

The contextual information building engine 116 can send the generated contextual information to a target entity, which can be a human analyst 117 or an automated remediation engine 118. In the former case, the human analyst 117 can use the contextual information to better understand the alert, such as to determine whether or not the alert is a true positive alert or a false positive alert. A true positive alert is an alert that correctly indicates that an issue has occurred, while a false positive alert is an alert that incorrectly indicates that an issue has occurred. The contextual information can also be used to determine a cause of the alert.

The automated remediation engine 118 is able to perform automated processing of a security alert, or any other type of alert, and to take action based on the processing. In some examples, the automated remediation engine 118 is able to access an information repository 120, which stores information relating to past processes that have been performed to address respective issues associated with various alerts that have been encountered by the computing arrangement 100.

The information repository 120 can be implemented as a collection of information stored on a storage device or a collection of storage devices. A process that has been performed to address an issue associated with an alert can include an investigation performed by an SOC to address the issue. An investigation includes a collection of tasks that can be performed by an entity (or a number of different entities), where an entity can refer to a human analyst, a machine, or a program. The information repository 120 can also contain past alerts (and related information), and investigations/remedial actions taken for past alerts. The information repository 120 can also store (based on user choice) generated contexts of past alerts.

By being able to leverage information in the information repository 120 regarding past processes that have been performed to address respective issues, the automated remediation engine 118 is able to determine the appropriate remediation action to take in response to a current alert produced by the alert generator 114. In this manner, a human analyst does not have to manually perform a time-consuming investigation that involves retrieving additional information, performing hypothesis testing, and so forth.

As used here, an engine (116 or 118 in FIG. 1) can be implemented using a computer or a number of different computers. More generally, an engine includes a processor and a storage medium storing instructions that upon execution on the processor cause the processor to perform various tasks. Executing instructions on a processor can refer to executing the instructions on one processor, or executing the instructions on multiple processors.

Figure 2:
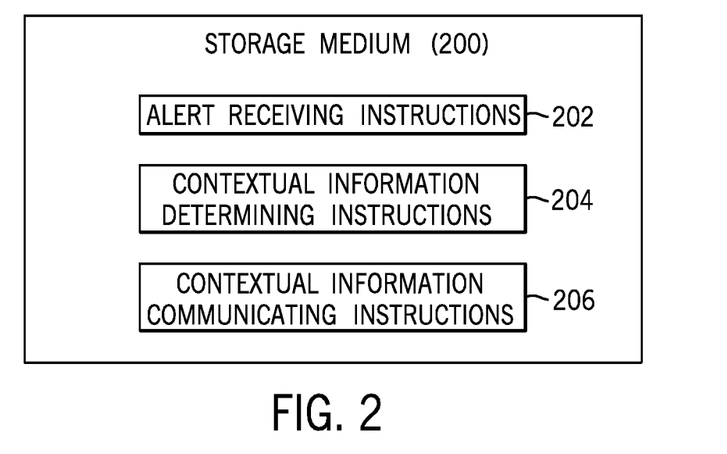
FIG. 2 is a block diagram of a storage medium storing machine-readable instructions for building contextual information according to some examples.

FIG. 2 is a block diagram of a non-transitory machine-readable or computer-readable storage medium 200 storing machine-readable instructions that upon execution cause a system to perform various tasks. The machine-readable instructions can be those of the contextual information building engine 116, for example.

The machine-readable instructions include alert receiving instructions 202 to receive an alert (e.g., generated by the alert generator 114) relating to an issue in the computing arrangement 100. The machine-readable instructions further include contextual information determining instructions 204 to determine contextual information for the alert.

The machine-readable instructions further include contextual communicating instructions 206 to communicate the contextual information for use in addressing the issue corresponding to the alert in the computing arrangement 100. For example, the contextual information can be transmitted (such as over a network) to a computing device of a human analyst (e.g., 117 in FIG. 1) or to the automated remediation engine 118.

The determined contextual information for a received alert can include any or some combination of various different types of the contextual information, such as the following:

Contextual information relating to the same alert or similar alerts in historical data (such as historical data stored in the information repository 120).

Contextual information relating to the same alert or similar alerts in a current time window.

Contextual information relating to entities or attributes associated with the alerts.

Contextual information relating to records for past investigations regarding the same alert or similar alerts.

Contextual information relating to records for past investigations for the same entity associated with the alert.

Contextual information regarding other behavior of the entity associated with the alert.

Although example types of contextual information are listed above, it is noted that in other examples, alternative or additional types of contextual information can be generated by the contextual information determining instructions 204.

Contextual Information Relating to the Same Alert or Similar Alerts in Historical Data Contextual information relating to previous instances of the same alert or similar alerts in historical data can include any or some combination of the following: statistics based on information in the historical data associated with the alerts (previous instances of the same alert or similar alerts), distributions of the alerts that are referred to by the historical data, and temporal associations between the alerts. The previous instances of the same alert can refer to occurrences of the same alert that has been issued in the past. Similar alerts can refer to alerts that are similar to each other based on a property (or multiple properties) associated with the alerts. Historical data can include data regarding alerts that have occurred in the past. The historical data can include information of properties of the alerts, such as time points at which the alerts occurred, locations at which the alerts occurred, events associated with the alerts (i.e., an event or a collection of events that triggered the creation of the an alert), and so forth.

Comparing a property associated with a current alert to a property of past alerts associated with past processes can refer to comparing one property associated with the current alert to one property of the past alerts, or to comparing multiple properties associated with the current alert to properties of the past alerts. In some examples, a distance function can be used to determine similarity between alerts. The distance function can perform a calculation based on metrics, where each metric corresponds to a property of an alert that is compared. The distance function can be based on a difference between values of a property (or multiple properties) of the alerts, a difference between a square of the values of a property (or multiple properties) of the alerts, and so forth.

The output similarity value produced by the distance function is a value that represents a degree of difference between the property (or properties) of respective alerts that are being compared. A lower value provided by the distance function can indicate that the alerts are more similar to one another, while a larger value produced by the distance function can indicate that the alerts are less similar to each other. Two alerts can be considered to be similar to each other if a similarity value produced by the distance function for the two alerts is less than a specified threshold, in some examples. Alternatively, a similarity function, e.g., cosine similarity function, can also be used, where a higher value will indicate more similarity.

Examples of properties that can be compared to determine whether alerts are similar to one another can include any or some combination of the following: a source of an alert, a type of alert, underlying events of the alerts, and tasks performed to respond to the alerts. Although specific examples of alert properties that can be compared are listed, it is noted that in other examples, other or additional properties of alerts can be compared.

As used here, the term "alerts" can refer to previous instances of the same alert or to similar alerts.

The distributions of the alerts that are referred to by the historical data can include a spatial distribution of the alerts or a temporal distribution of the alerts.

A spatial distribution includes a distribution of the alerts across different physical or virtual locations. Different physical locations can refer to different geographic locations (e.g., different cities, different states or provinces, different countries, etc.), different office locations of an enterprise, different physical machines, and so forth. Different virtual locations can refer to different virtual networks (e.g., virtual local area networks or VLANs), different virtual machines, and so forth. A virtual network can refer to a logical network that is established programmatically using an underlying physical communication infrastructure. A virtual machine can refer to a logical partition of a physical machine (or multiple physical machines) that is able to share physical resources of the physical machine(s) with other virtual machine(s), and where the virtual machine is able to execute program code such as an operating system and an application program.

A temporal distribution includes a distribution of the alerts across different time instances, such as over different hours, days, weeks, months, years, or other time intervals.

In further examples, the contextual information based on historical data can include information temporally correlating a first alert and a second alert (the first and second alerts can include previous instances of the same alert or similar alerts). The first and second alerts are temporally correlated if there is some specified order between the first and second alerts (e.g., the first alert occurs before the second alert) or if there is some time closeness between the first and second alerts (e.g., the first and second alerts occur within a specified time offset of one another). The temporal correlation can be based on many instances of the first and second alerts to determine if there is a temporal order pattern or a temporal closeness pattern. The temporal correlation can be mined from the historical data using an associative mining technique or any other analytics technique that can determine relationships between data.

The contextual information can also include statistics computed based on information associated with the alerts referred to by the historical data. The statistics can be computed based on information associated with individual alerts or bundles of alerts. Statistics can include a mean, median, sum, quantile, or any other measure that is computed based on an attribute in the information associated with the alerts. The information associated with the alerts can include attributes such as durations of events that triggered the alerts, an amount of data transferred in the events that triggered the alerts, bandwidths consumed by the events that triggered the alerts, usage of a central processing unit (CPU) and/or memory relating to the alerts, file accesses relating to the alerts, input/output (I/O) operations relating to the alerts, values of hardware performance counters relating to the alerts, and so forth.

The statistics, spatial distribution, temporal distribution, and/or temporal correlation can be presented visually to the human analyst 117 (such as in the form of plots, graphs, etc., displayed by a display of the computing device belonging to the human analyst 117), or can be sent to the automated remediation engine 118.

Contextual Information Relating to the Same Alert or Similar Alerts in a Current Time Window A current time window can refer to the time window during which events are being considered and alerts are generated based on detected events. The current time window is contrasted with previous time windows relating to events and alerts that have occurred in the past and can be part of the historical data in the information repository 120.

The contextual information based on the current time window can include a spatial distribution of the alerts (previous instances of the same alert or similar alerts) across physical or virtual locations, where the alerts considered are those that occurred within the current time window (alerts in previous time windows are not considered for determining the spatial or temporal distributions).

The contextual information based on the current time window can also include statistics based on information associated with alerts that occurred within the current time window (such as alerts that occurred within the time window at other locations). The statistics can be computed based on information associated with individual alerts or bundles of alerts.

Contextual Information Relating to Entities or Attributes Associated with the Alerts An entity can include a machine, a program, or a human user.

Examples of attributes associated with an entity can include any or some combination of the following: a network address (such as an Internet Protocol or IP address) of the machine or program, a network port number (such as a Transmission Control Protocol or TCP port number) used by the machine or program, a domain name of the machine or program, a protocol used for communication the machine or program, an application program, an operating system, an amount of data transferred, a user identifier, a user's role, and so forth.

The contextual information relating to entities or attributes can include any or some combination of the foregoing listed information. More generally, in some examples, such contextual information can refer to a user that the alert relates to, a machine involved in the alert, a network address involved in the alert, a network port involved in the alert, a domain name involved in the alert, a protocol involved in the alert, a program involved in the alert, and an amount of transferred data that triggered the alert.

In further examples, the contextual information relating to entities or attributes can include contextual information relating to entities or attributes for entities within a specified group (or multiple specified groups). The specified group can include a predefined group (e.g., a group of entities defined by an analyst in an SOC), or specified groups can be based on similarity between the groups, such as groups that share some common feature (e.g., share a number of entities).

In some examples, differences between values of attributes associated with the alerts in a current time window and a previous time window (or multiple previous time windows) can be calculated. The differences can be presented as contextual information. For example, if the attribute is the amount of data transferred, then the difference of the amount of data transferred for an alert in the current time window and the amount of data transferred for an alert in a previous time window can be computed and presented. The magnitude of the differences between values of attributes in different time windows can indicate an issue that should be addressed.

Contextual Information Relating to Records for Past Investigations Regarding the Same Alert or Similar Alerts As noted above, the information repository 120 (FIG. 1) can store information regarding past investigations (or more generally past processes) that have been performed to address issues in response to past alerts. The contextual information building engine 116 can search the information regarding past processes in the information repository 120 to identify a past process (or multiple past processes) that has (have) been performed in response to a previous instance of the same alert or in response to a similar alert (similar to a current alert being considered).

The results of the search can be presented to the analyst 117 or the automated remediation engine 118. The results of the search can include information of an identified past process (which includes the tasks performed in the past process that are part of a remediation action). If multiple processes are identified in the search, the multiple processes can be ranked in terms relevance to the current alert being considered, such as a ranking based on how similar the past alerts (associated with the multiple processes) are to the current alert.

Contextual Information Relating to Records for Past Investigations for the Same Entity Associated with the Alert The current alert that is being considered may be associated with an entity (machine, program, or user). The current alert may have been triggered in response to an activity of the entity, or the current alert may have been triggered in response to an activity affecting the entity.

The contextual information building engine 116 can search in the information repository 120 for records of past investigations (or more generally past processes) that were performed in relation to the entity (e.g., past processes performed to address an alert that impacted or was triggered by the entity, or to address an alert based on an activity on the entity). The information regarding past processes on the entity can provide contextual information regarding past actions taken in relation to the entity. Contextual information regarding other actions relating to the entity associated with the alert can provide further context regarding a current alert.

If multiple past processes are identified in the search, then the multiple processes can be ranked in terms relevance to the current alert being considered.

Contextual Information Regarding Other Behavior of the Entity Associated with the Alert The current alert that is being considered may be associated with an entity (machine, program, or user). The current alert may have been triggered in response to an activity of the entity, or the current alert may have been triggered in response to an activity affecting the entity.

The contextual information building engine 116 can search in the information repository 120 for information pertaining to other past behavior of the entity. For example, the entity may have executed certain programs or performed certain actions in the past, which may be relevant to the analysis pertaining to the current alert.

Contextual Information Building Process

Figure 3:
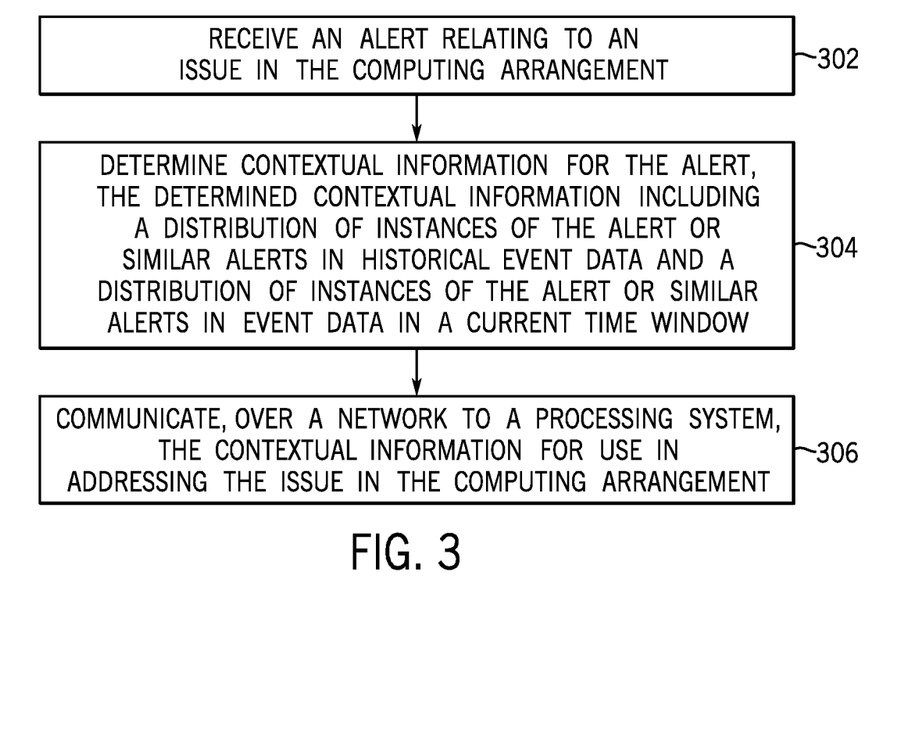
FIG. 3 is a flow diagram of a process of an automated contextual information building engine according to some examples.

FIG. 3 is a flow diagram of a contextual information building process according to some examples, which may be performed by the contextual information building engine 116, for example.

The contextual information building process includes receiving (at 302) an alert relating to an issue in the computing arrangement 100. The contextual information building process further includes determining (at 304) contextual information for the alert, the determined contextual information including a distribution of instances of the alert or similar alerts in historical event data and a distribution of instances of the alert or similar alerts in event data in a current time window.

The contextual information building process further includes communicating (at 306), over a network to a processing system (e.g., the automated remediation engine 118 of FIG. 1), the contextual information for use in addressing the issue in the computing arrangement 100.

Computing System

Figure 4:
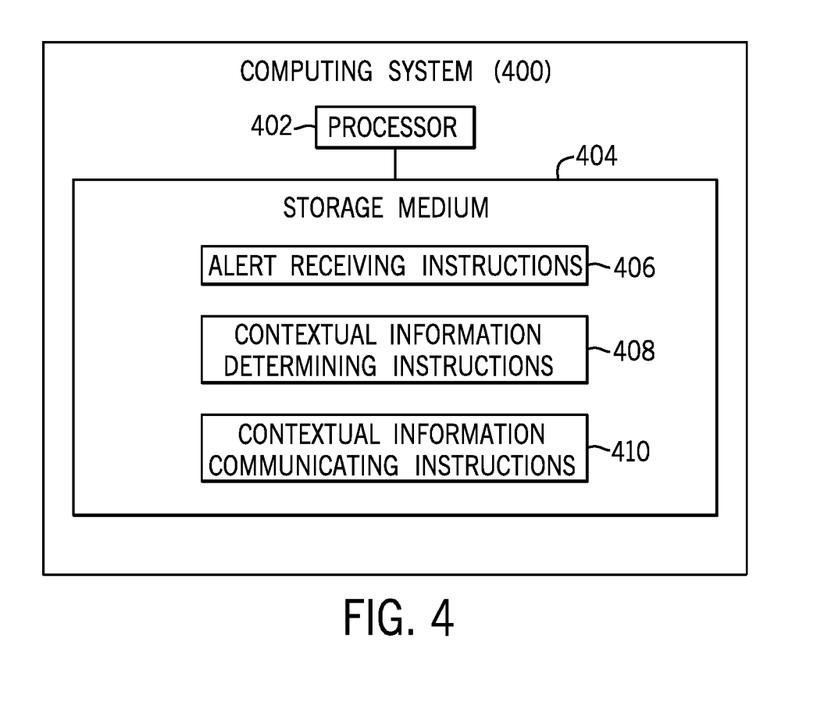
FIG. 4 is a block diagram of a computing system according to some examples.

FIG. 4 is a block diagram of a computing system 400, which can be implemented as a computer or an arrangement of computers. The computing system 400 includes a processor 402 (or multiple processors). A processor can include a microprocessor, a core of a multi-core microprocessor, a microcontroller, a programmable integrated circuit, a programmable gate array, or another hardware processing circuit.

The computing system 400 further includes a storage medium 404 storing machine-readable instructions executable on the processor 402 to perform various tasks. The storage medium 404 stores alert receiving instructions 406 to receive an alert relating to an issue in the computing arrangement 100.

The storage medium 404 further stores contextual information determining instructions 408 to determine contextual information for the alert, the determined contextual information comprising distributions of previous instances of the alert or similar alerts, and information of past investigations to resolve the issue.

The storage medium 404 further stores contextual information communicating instructions 410 to communicate, to a management system, the contextual information for use in addressing the issue in the computing arrangement 100.

The storage medium 200 (FIG. 2) or 404 (FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that upon execution cause a system to:
   receive a first alert relating to an issue in a computing arrangement;
   determine a second alert that is similar to the first alert, based on comparing a property of the second alert to a property of the first alert by applying a distance function that calculates a similarity value based on a difference between the property of the second alert and the property of the first alert;
   determine contextual information for the first alert, the determined contextual information comprising spatial and temporal distributions of previous instances of the second alert that is similar to the first alert;
   communicate, to a remediation engine, the contextual information for use in addressing the issue in the computing arrangement; and
   perform, by the remediation engine, a remediation action that resolves the issue.

2. The non-transitory machine-readable storage medium of claim 1, wherein the spatial distribution of the previous instances of the second alert comprises a distribution of the previous instances of the second alert across different physical or virtual locations.

3. The non-transitory machine-readable storage medium of claim 1, wherein the temporal distribution of the previous instances of the second alert comprises a distribution of the previous instances of the second alert across different time instances.

4. The non-transitory machine-readable storage medium of claim 1, wherein the contextual information further comprises information temporally correlating the first alert and the second alert.

5. The non-transitory machine-readable storage medium of claim 1, wherein the contextual information further comprises a spatial distribution of instances of the second alert within a current time window.

6. The non-transitory machine-readable storage medium of claim 1, wherein the contextual information further comprises attributes associated with the second alert, the attributes selected from among a user that the second alert relates to, a machine involved in the second alert, a network address involved in the second alert, a network port involved in the second alert, a domain name involved in the second alert, a protocol involved in the second alert, a program involved in the second alert, and an amount of transferred data that triggered the second alert.

7. The non-transitory machine-readable storage medium of claim 6, wherein the contextual information comprises a difference between a value of a given attribute in a first time window and a value of the given attribute in a second time window.

8. The non-transitory machine-readable storage medium of claim 1, wherein the contextual information comprises a peer group of users, machines, or programs that share a feature.

9. The non-transitory machine-readable storage medium of claim 1, wherein the contextual information comprises information regarding past investigations for resolving the second alert.

10. The non-transitory machine-readable storage medium of claim 1, wherein the property of the first alert and the property of the second alert are selected from among an alert source, an alert type, events of an alert, and tasks performed in response to an alert.

11. A method of a computing system comprising a processor, the method comprising:
    receiving a first alert relating to an issue in a computing arrangement;
    determining a second alert that is similar to the first alert, based on comparing a property of the second alert to a property of the first alert by applying a distance function that calculates a similarity value based on a difference between the property of the second alert and the property of the first alert;
    determining contextual information for the first alert, the determined contextual information comprising a distribution of instances of the first alert and the second alert in historical event data, and a distribution of instances of the first alert and the second alert in event data in a current time window;

communicating, over a network to a remediation engine, the contextual information for use in addressing the issue in the computing arrangement; and performing, by the remediation engine, a remediation action that resolves the issue.

12. The method of claim 11, wherein the contextual information further comprises a statistic of values of an attribute in the historical event data and a statistic of values of the attribute in the current time window.

13. The method of claim 11, wherein the contextual information further comprises information of past investigations to resolve the issue in the computing arrangement.

14. The method of claim 11, wherein the first alert involves an entity, and wherein the contextual information further comprises information of past investigations performed with respect to the entity.

15. The method of claim 11, wherein the contextual information further comprises information temporally correlating the first alert and the second alert.

16. A computing system comprising:
a processor; and
a non-transitory storage medium storing instructions executable on the processor to:
receive a first alert relating to an issue in a computing arrangement;
determine a second alert that is similar to the first alert, based on comparing a property of the second alert to a property of the first alert by applying a distance function that calculates a similarity value based on a difference between the property of the second alert and the property of the first alert;
determine contextual information for the first alert, the determined contextual information comprising distributions of previous instances of the second alert that is similar to the first alert, and information of past investigations to resolve the issue;
communicate, to a remediation engine, the contextual information for use in addressing the issue in the computing arrangement; and
perform, by the remediation engine, a remediation action that resolves the issue.

17. The computing system of claim 16, wherein the distributions of previous instances of the second alert comprise a spatial distribution of the previous instances of the second alert across different virtual networks.

18. The non-transitory machine-readable storage medium of claim 1, wherein the determined contextual information further comprises spatial and temporal distributions of previous instances of the first alert, and wherein the instructions upon execution cause the system to:
communicate, to the remediation engine, the contextual information comprising the spatial and temporal distributions of previous instances of the first alert for use in addressing the issue in the computing arrangement.

19. The computing system of claim 16, wherein the contextual information further comprises information temporally correlating the first alert and the second alert.

20. The computing system of claim 16, wherein the determined contextual information further comprises a spatial distribution of instances of the second alert within a current time window.

* * * * *